(12) United States Patent
Dupree

(10) Patent No.: US 9,269,276 B2
(45) Date of Patent: Feb. 23, 2016

(54) MUSIC TEACHING AID

(71) Applicant: Baby Grand Products LLC, Lindenwold, NJ (US)

(72) Inventor: Shavonna D. Dupree, Lindenwold, NJ (US)

(73) Assignee: Baby Grand Products LLC, Lindenwold, NJ (US)

(*) Notice: Subject to any disclaimer, the term of this patent is extended or adjusted under 35 U.S.C. 154(b) by 193 days.

(21) Appl. No.: 13/768,118

(22) Filed: Feb. 15, 2013

(65) Prior Publication Data

US 2013/0214485 A1     Aug. 22, 2013

Related U.S. Application Data

(60) Provisional application No. 61/600,317, filed on Feb. 17, 2012.

(51) Int. Cl.
*A63F 3/00* (2006.01)
*G09B 15/02* (2006.01)
*G09B 15/00* (2006.01)

(52) U.S. Cl.
CPC .................................. *G09B 15/00* (2013.01)

(58) Field of Classification Search
USPC ...................... 273/123 R, 242, 243, 248, 249
See application file for complete search history.

(56) References Cited

U.S. PATENT DOCUMENTS

| | | | | |
|---|---|---|---|---|
| 1,558,083 A * | 10/1925 | Gittens | ............ | 273/287 |
| 4,895,374 A * | 1/1990 | Bowles | ............ | 273/249 |
| 5,055,053 A * | 10/1991 | Hyman | ............ | 434/343 |
| 6,086,378 A * | 7/2000 | Johnson | ............ | 434/128 |
| 7,629,527 B2 * | 12/2009 | Hiner et al. | ............ | 84/470 R |
| 2003/0151628 A1* | 8/2003 | Salter | ............ | 345/773 |
| 2003/0167902 A1* | 9/2003 | Hiner et al. | ............ | 84/477 R |
| 2011/0259178 A1* | 10/2011 | Hiner et al. | ............ | 84/477 R |

* cited by examiner

*Primary Examiner* — Nini Legesse
(74) *Attorney, Agent, or Firm* — Baker & Hostetler LLP

(57) ABSTRACT

A music teaching aid may incorporate a pinball-like game. The music teaching aid may comprise a playing field depicting a musical staff and a keyboard. Lines and spaces on the staff may contain pockets into which a ball may fall and be contained. The pockets may correspond to notes on a staff, which may correspond to notes on the keyboard. A ball launched into the playing field may fall into a pocket. A user may select a note on the keyboard. If the selected note matches the note corresponding to the pocket having the ball, the ball may be released from the pocket. The note may be audibly rendered. The ball may be released into or out of the playing field. The music teaching aid may be implemented mechanically, electrically, or any appropriate combination thereof.

20 Claims, 17 Drawing Sheets

Layout of features

| | Lesson | Game | Selection | Staff | Display | Sounds | Metronome | Power |
|---|---|---|---|---|---|---|---|---|
| | | | | | | On/Off | On/Off | On/Off |
| Staff and Keys | * | * | Notes O o ♩ ♪ ♩. | Treble 𝄞 | Staff On/Off | | | |
| Notes | * | * | Accidentals ♯ ♭ ♮ | Bass 𝄢 | Piano On/Off | | | |
| Scales | * | * | Chords Major-Minor | Grand | | | | |
| Accidentals | * | * | | | | | | |
| Chords | * | * | | | | | | |
| Songs | * | * | | | | | | |
| Free Play On/Off | | | | | Score | | | |

FIGURE 6

MUSIC TEACHING AID

CROSS REFERENCE TO RELATED APPLICATIONS

The instant application claims priority to U.S. provisional patent application No. 61/600,317, filed Feb. 17, 2012, titled "Music Teaching Aid." U.S. provisional patent application No. 61/600,317 is incorporated by reference herein in its entirety.

TECHNICAL FIELD

The technical field relates generally to teaching music and more specifically to music teaching aids.

BACKGROUND

Children are known to have short attention spans. This is especially noticeable when trying to teach a child something that the child considers boring. One way to overcome this is to make the teaching experience enjoyable, such that the child has fun while learning.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

In an example embodiment, a music teaching aid may incorporate a pinball-like game. The pinball-like game may comprise a depiction of a musical staff or musical staves and a keyboard or the like. Lines and spaces on the staves may contain "pockets" or "portions" into which a ball may fall and be contained. The pockets may correspond to notes on a staff. And the notes of a staff may correspond to notes on the keyboard. When a ball is launched into the playing field comprising the staff or staves, the ball may fall into a pocket. A user may select a note on the keyboard corresponding to the note indicated by the pocket into which the ball has fallen. If the selected note matches the note corresponding to the pocket having the ball, the ball may be released from the pocket. And the user may hear the sound of the note, or any other appropriate audio, visual, and/or mechanical effect. In various example embodiments, the ball may (virtually and/or physically) fall through an opening on a surface of the playing field or may be pushed back into play. If the selected note does not match the note corresponding to the pocket having the ball, in an example embodiment, no sound may be provided. Or, an audio, visual, and/or mechanical effect may be provided indicating that the selected note is incorrect. The pinball-like music teaching aid may be implemented mechanically, electrically, or any appropriate combination thereof.

The herein described music teaching aid may assist in teaching a user how to read music. Because of its play value, a user may learn the basic fundamentals necessary to reading music through simple play. For example, rather than teaching music by first becoming familiar with a staff and subsequently learning keys (e.g., piano keys), via use of the herein described music teaching aid, staff and keys may be learned concurrently. As the ball moves in a relatively constant motion, a user may be provided with a sense of playing an actual instrument (e.g., piano or the like). Through practice and frequent use, the user may learn how piano keys, percussion instruments, or the like, relate to the staff and become more efficient in quickly selecting the correct keys. Selection of the correct or incorrect key may provide a user an immediate response verifying that the key is in fact correct or incorrect.

In various other example embodiments, a music teaching aid may comprise any appropriate combination of a puzzle; a press board; a story book; a maze; a flash card; a flip top pad; a staff, line, and space puzzle; a magnetic puzzle; a PLAY-DOH set; an ink stamp; a foosball game; a piano keys pop-up music teaching aid; a floor block; music animals; a music marble game; a piano ball game; a note puzzle; a notes and rests puzzle face; music Chinese checkers; a staff puzzle, a finger number puppet; three-dimensional flash cards; a music labyrinth; and/or a stacking a staff music teaching aid.

BRIEF DESCRIPTION OF THE DRAWINGS

Reference is made herein to the accompanying drawings, which are not necessarily drawn to scale.

FIG. 6 depicts various example features that may be implemented in a music teaching aid.

DETAILED DESCRIPTION OF ILLUSTRATIVE EMBODIMENTS

Figure 1:
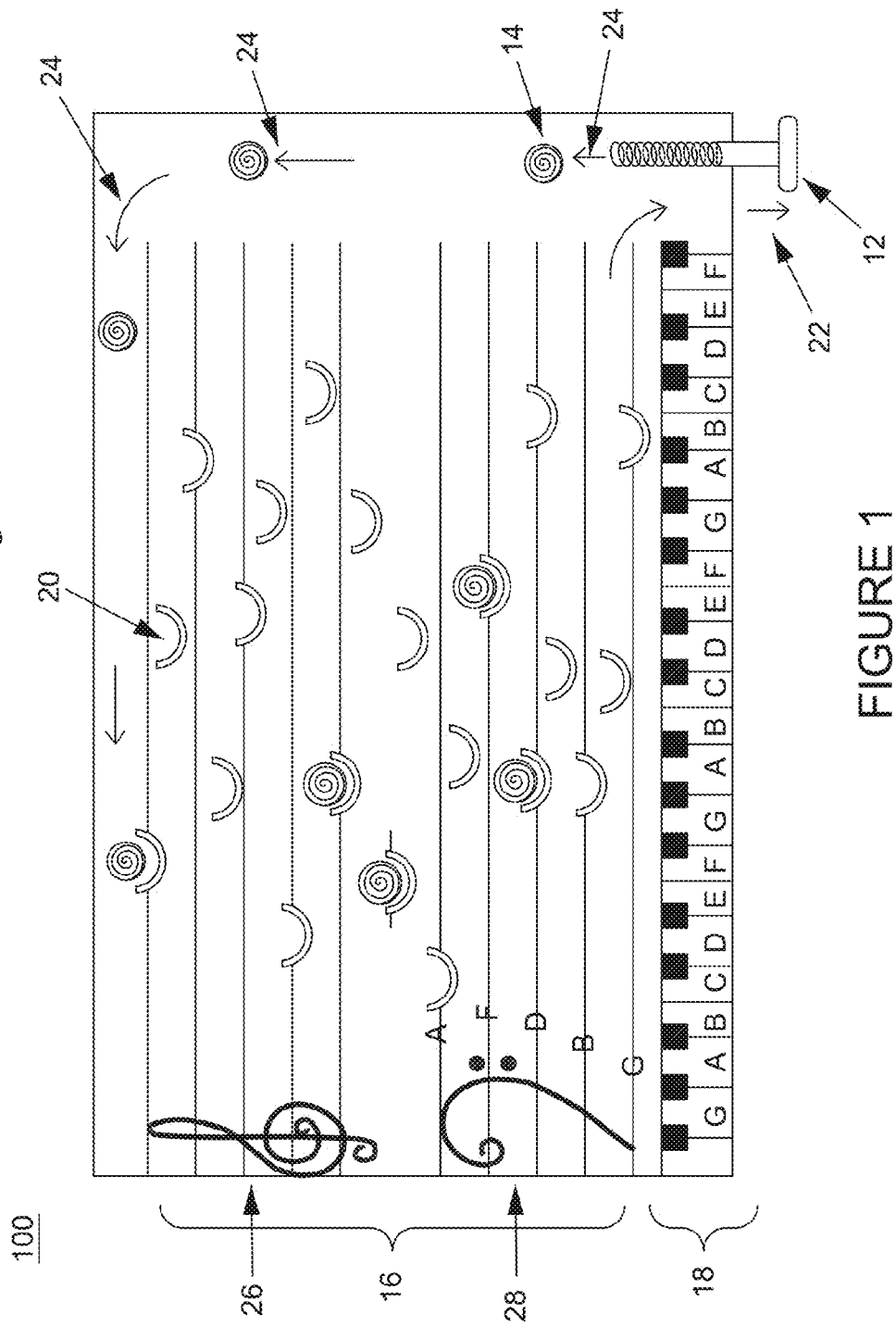
FIG. 1 is a diagram illustrating an example music teaching aid.
Figure 2:
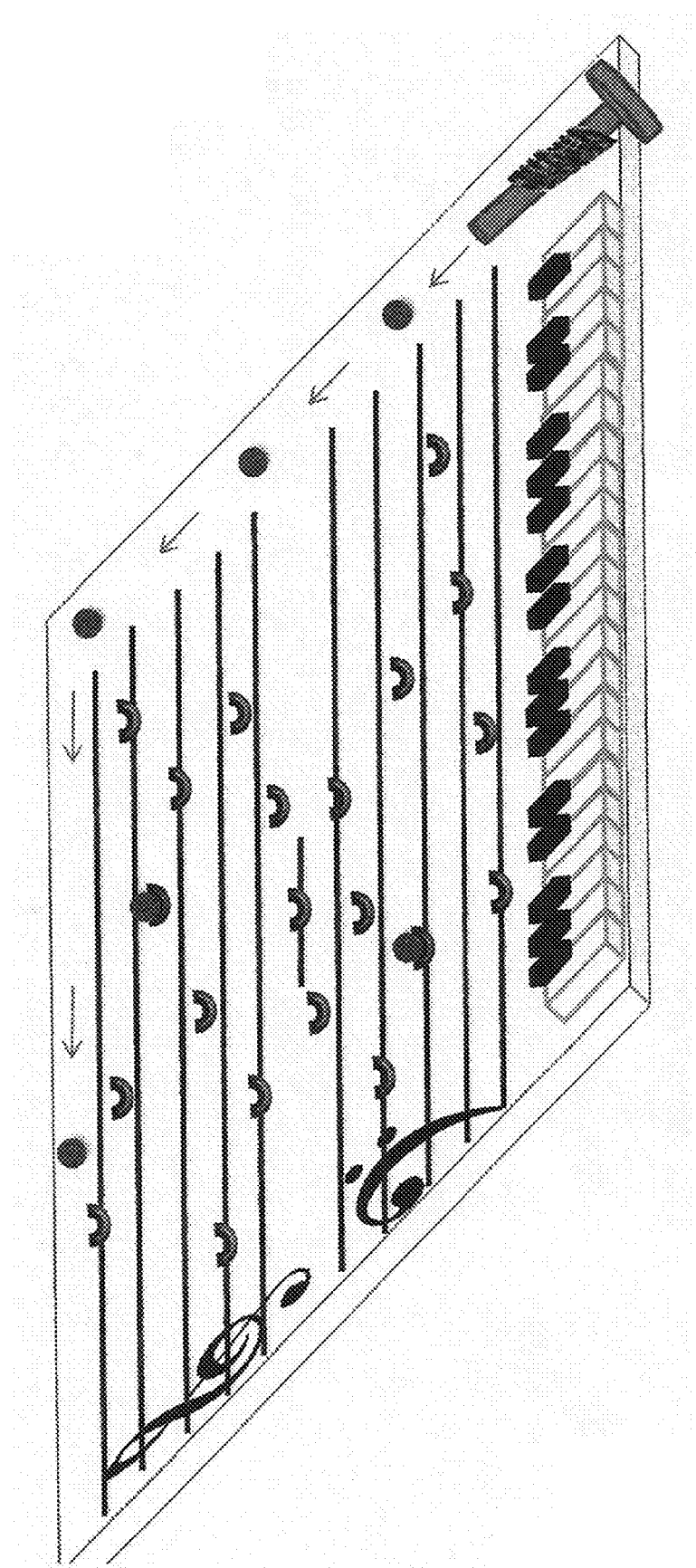
FIG. 2 is another diagram illustrating an example music teaching aid.
Figure 3:
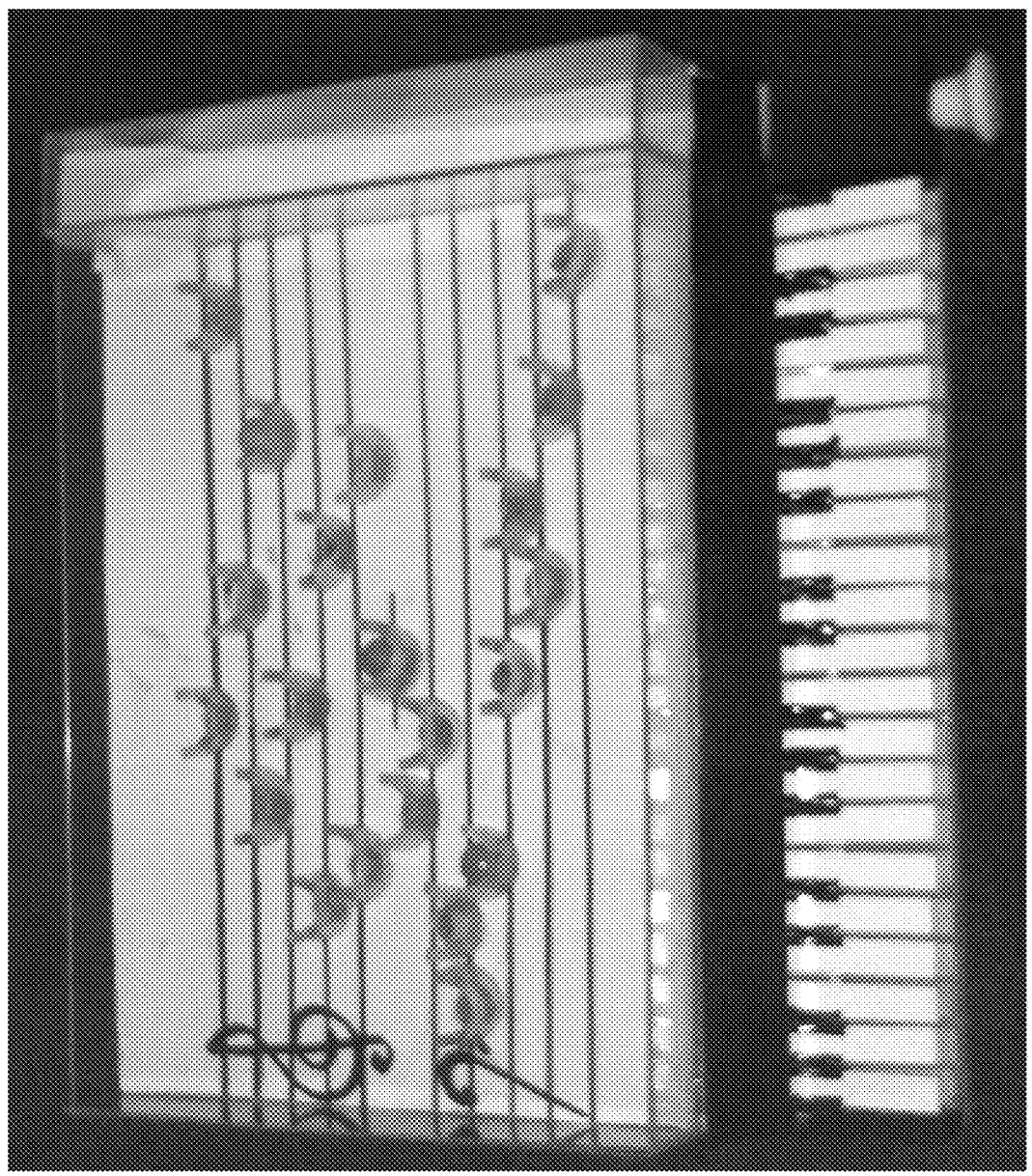
FIG. 3 depicts a representation of an example prototype music teaching aid.
Figure 4:
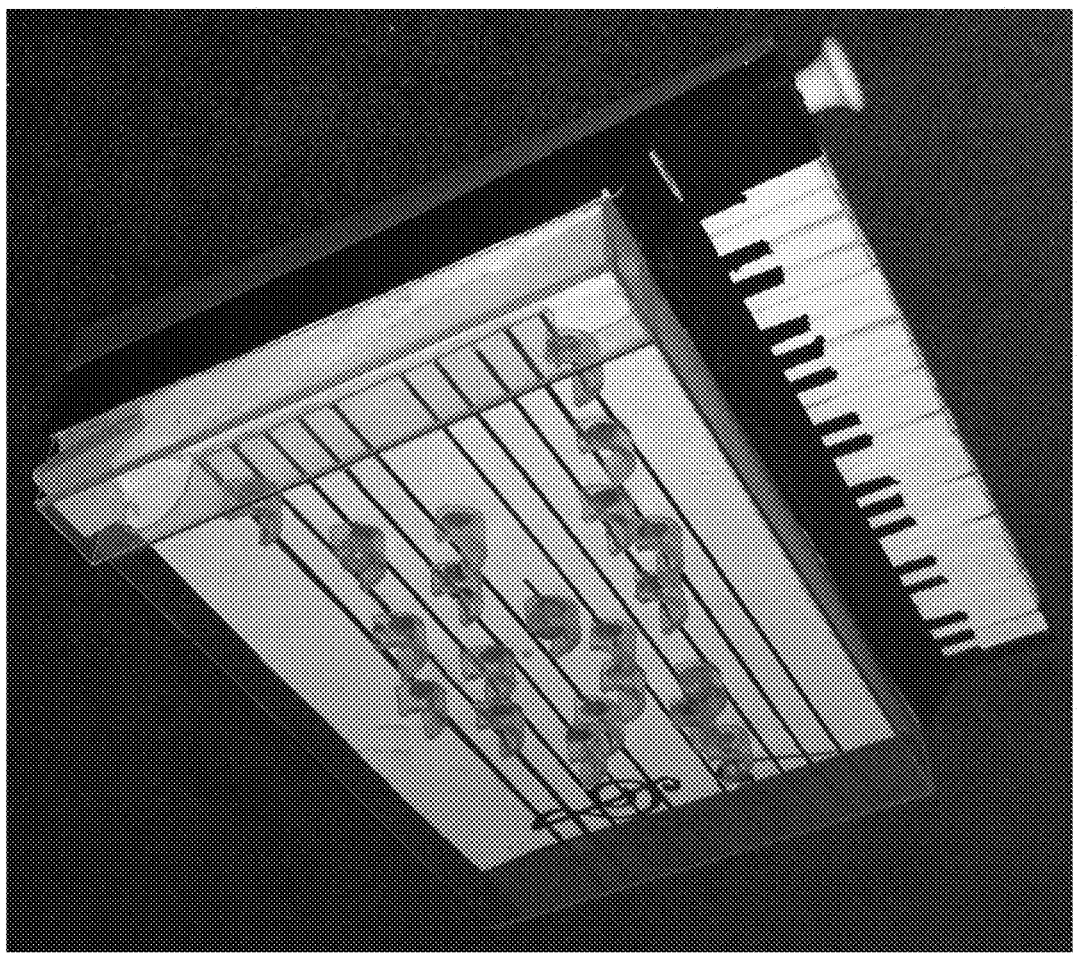
FIG. 4 depicts another representation of an example prototype music teaching aid.
Figure 5:
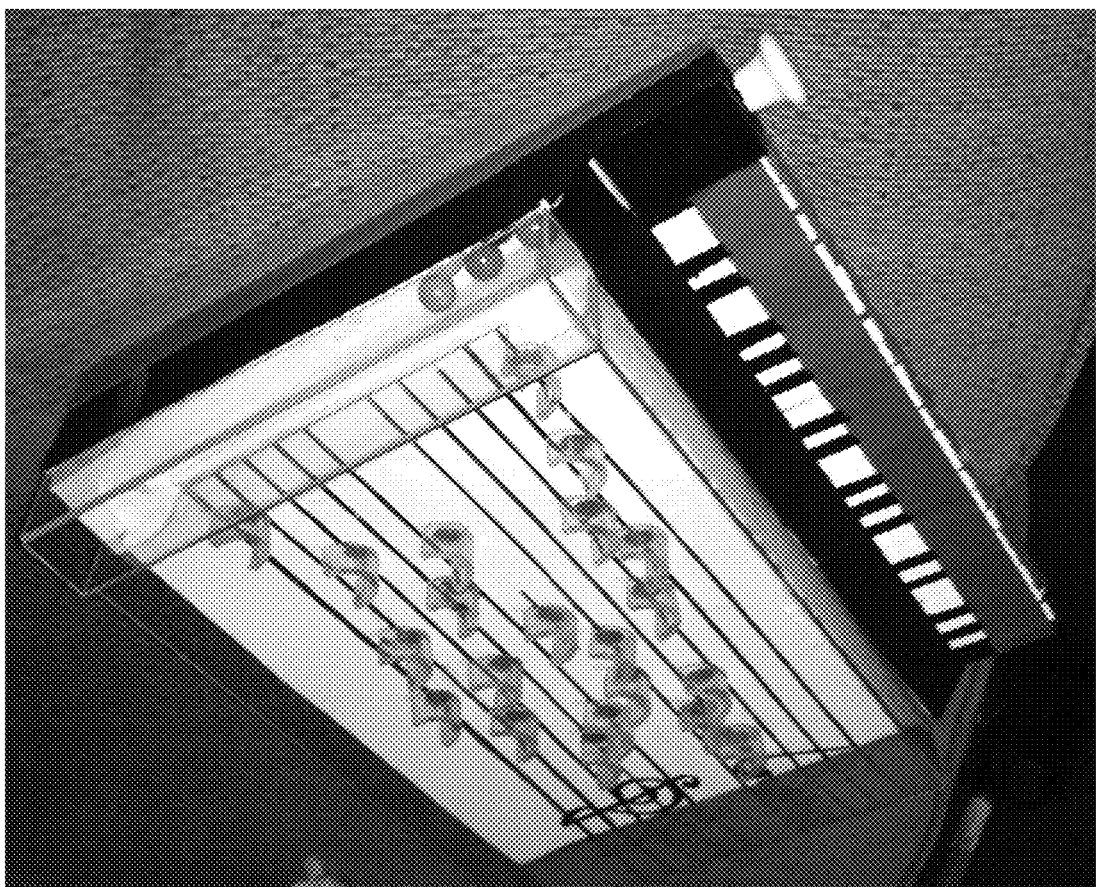
FIG. 5 depicts yet another representation of an example prototype music teaching aid.

FIG. 1 is a diagram illustrating an example music teaching aid 100. FIG. 2 is a perspective representation of an example embodiment of the music teaching aid. FIG. 3, FIG. 4, and FIG. 5 depict examples of mechanical prototype music teaching aids. Referring to FIG. 1, a ball 14 may be launched from a plunger like mechanism 12. As shown in FIG. 1, the plunger 12 may be pulled back, in the direction of arrow 22. When the plunger 12 is released, the ball 14 may move along the path as indicated by arrows 24, in the playing field 16 comprising staff 26 and staff 28. As the ball traverses through the playing field (e.g., toward the keyboard 18), the ball may fall into one of the portions or pockets 20. Note only one pocket is marked as pocket 20 for the sake of simplicity.

Each pocket may represent a musical note or the like. Upon a game ball falling into a pocket, the game ball may be retained proximate to the pocket. In an example embodiment, as a ball is retained in a pocket, the musical note corresponding to the pocket may be audibly rendered. The musical note may be audibly rendered as if played by any appropriate musical instrument. The keyboard 18 may comprise a plurality of keys. Each key of the plurality of keys may be associated with a respective note (similar to keys of a piano being associated with respective notes). The user of the music teaching aid 100, may select a note on the keyboard 18. If the note corresponding to the selected key of the keyboard 18 matches the note corresponding to a pocket into which a game ball has fallen, the music teaching aid 100 may provide an indication that the selected note is correct. Any appropriate indication may be provided. For example, a light and/or a buzzer may be provided indicating that the notes match. And/or the music teaching aid, or any appropriate portion thereof, may vibrate to indicate that the notes match. In an example embodiment, the matching note may be audibly provided. Thus, if the keyboard 18 represents a piano keyboard, the note as heard when played on a piano may be provided. The sound may be provided as though it were produced by any appropriate instrument. Thus, a note may be audibly provided to sound like it was produced by any appropriate instrument regardless of the representation of portion 18. The indication may be audibly provided, visually provided (e.g., lights could be turned on and/or flash), mechanically provided (e.g., vibration), are any appropriate combination thereof.

Upon a correct note being selected on the keyboard 18, the corresponding ball may be released from the pocket. A game ball being released from a pocket may be release out of the playing field 16 or into the playing field 16. For example, a game ball being released out of the playing field 16 may fall through an opening in the surface of the playing field 16. In an example embodiment, the released ball may be available for further play via reentry into the playing field 16 via use of the plunger 12. In an example embodiment, upon a correct note being selected on the keyboard 18, the corresponding game ball may be released into the playing field by the game ball being pushed back onto the playing field 16.

In various example embodiments, staves may remain stationary, or as time progresses, staves of the playing field may move to allow a song to be played. The staves may move in any appropriate direction, such as, for example, left to right, right to left, top to bottom, bottom to top, or any appropriate combination thereof. Any appropriate staff or combination of staves may be represented. For example, a staff may represent a Treble Staff, a Bass Staff, a Grand Staff, including ledger lines, or any appropriate combination thereof. A Staff may be oriented horizontally or vertically.

A portion or pocket of the playing field may be represented in any appropriate manner. The depiction of a pocket is not limited to any shape or depiction. For example, a pocket may be represented by a figure, an icon, a depiction, a character, an instrument, or the like, or any appropriate combination thereof. In an example embodiment, a pocket is indicative of a location on a staff, and thus may have a note corresponding thereto.

In an example embodiment, a ball may be represented by any appropriate entity, such as, for example, a light a figure, an icon, a depiction, a character, or the like, or any appropriate combination thereof. For example, a ball may be represented by an instrument, such as, for example, a piano, a guitar, a drum, or the like. A ball may be represented by a light. In an example embodiment, the number of balls may be the same as the number of notes in a song. And accordingly, each subsequent ball that is launched may land in the subsequent corresponding note in the song. Balls may be launched manually and/or automatically.

In an example embodiment, multiple balls may be launched concurrently, wherein each ball represents a note in a chord. As the balls traverse the playing field, the balls may land in pockets representing corresponding notes of a chord. The player may select multiple notes on the keyboard, or the like to play the chord. In an example embodiment, keys off a chord may be concurrently selected in order to match the notes of a chord.

A staff can represent any appropriate staff. For example, as depicted in FIG. 1, the two staves 26 and 28 represent a treble clef staff and a base clef staff respectively, and the combination represents a grand staff.

Any appropriate instrument can be represented. Example instruments include a piano, a keyboard, a harp, an organ, a percussion instrument, or any appropriate combination thereof. For example, if the instrument is an organ, three staves may be depicted, one depicting notes to be played (selected) by the left hand, one depicting notes to be played (selected) by the right hand, and the third depicting the pedals to be depressed by a foot on a pedal board.

In another example embodiment, percussion instruments may be represented. Accordingly, staves would be cleffless and represent the percussion instrument to be played. The keyboard section 18 of FIG. 1 may represent a selection of percussion instruments.

In an example embodiment, multiple players may use the music teaching aid, such that players may play a song together. Players may compete to finish a song first. Players may race to play chords.

In various example embodiments, the music teaching aid may be constructed in various manners. For example, the music teaching aid may be constructed as a mechanical device with a physical plunger and physical pinballs. The music teaching aid may be implemented via an electrical device comprising a user interface allowing a player to select notes, chords, percussion instruments, etc. The electrical device may render the visual, audio, and/or mechanical aspects of the music teaching aid. For example, the music teaching aid could be implemented on a computer, processor, server, mobile device, or the like.

The music teaching aid may be utilized to teach music theories. Various features may be implemented as depicted, for example, in FIG. 6. For example, the music teaching aid may be used to teach piano basics, such as, for example, piano keys, staves, notes, scales, accidentals, chords and/or songs. The music teaching aid may have visual lights and audio sounds. A lesson book may be utilized to explain each lesson mode and contain instructions of the music teaching aid and its functionalities. Each functional component of the music teaching aid may operate separately and/or in combination with several mode variations. The music teaching aid may be utilized to customize lessons.

In an example embodiment, the music teaching aid may comprise lesson modes including Staff and Keys, Notes, Scales, Accidentals—Sharps, Flats and Natural, Chords, and/or Song Selection Mode. Learning may be customized to individual. For example, in the notes lesson mode, selection notes (e.g., whole, half, quarter, dotted half or eighth notes)

may be taught in combination with or without accidentals (e.g., sharps, flats or natural) on either staff (e.g., treble, bass or grand), with or without display letters (e.g., on or off), with or without sounds (e.g., on or off), with or without the metronome (e.g., on or off).

In accidentals lesson mode, accidentals (e.g., sharps, flats and/or naturals) lessons may be taught with or without any combination of notes (e.g., whole, half, quarter, dotted half or eighth notes) on either staff (e.g., treble, bass or grand) with or without display letters (e.g., on or off), with or without sounds (e.g., on or off), with or without the metronome (e.g., on or off).

In chords lesson mode, chords e.g., (major or minor) may be taught with or without accidentals and may be taught on either staff (e.g., treble, bass or grand) with any combination of notes (e.g., whole, half, quarter, dotted half or eighth notes) with or without display letters (e.g., on or off), with or without sounds (e.g., on or off), with or without the metronome (e.g., on or off).

In an example embodiment, a game play mode may be played separate from lesson and free play modes. When selecting game play, lesson and free play mode may automatically turn off, but may function the same as lesson mode, having the option to customize play. Game play mode may have a scoring function. For example, in game play notes, selection notes (e.g., whole, half, quarter, dotted half or eighth notes) game may be played in combination with or without accidentals (e.g., sharps, flats or natural), on either Staff (treble, bass or grand), with or without display letters (e.g., on or off), with or without sounds (e.g., on or off), with or without the metronome (e.g., on or off). A score indicating correct answers, total question, etc., may be provided.

In game play accidentals, selection accidentals (e.g., sharps, flats and/or naturals) game may be played with any combination of notes (e.g., whole, half, quarter, dotted half or eighth notes) on either staff (e.g., treble, bass or grand), with or without display letters (e.g., on or off), with or without sounds (e.g., on or off), with or without the metronome (e.g., on or off). A score indicating correct answers, total question, etc., may be provided.

In game play chords, selection chords with or without accidentals may be played with any combination of notes (e.g., whole, half, quarter, dotted half or eighth notes), on either staff (e.g., treble, bass or grand), with or without display letters (e.g., on or off), with or without sounds (e.g., on or off), with or without metronome (e.g., on or off). A score indicating correct answers, total question, etc., may be provided.

Figure 7:
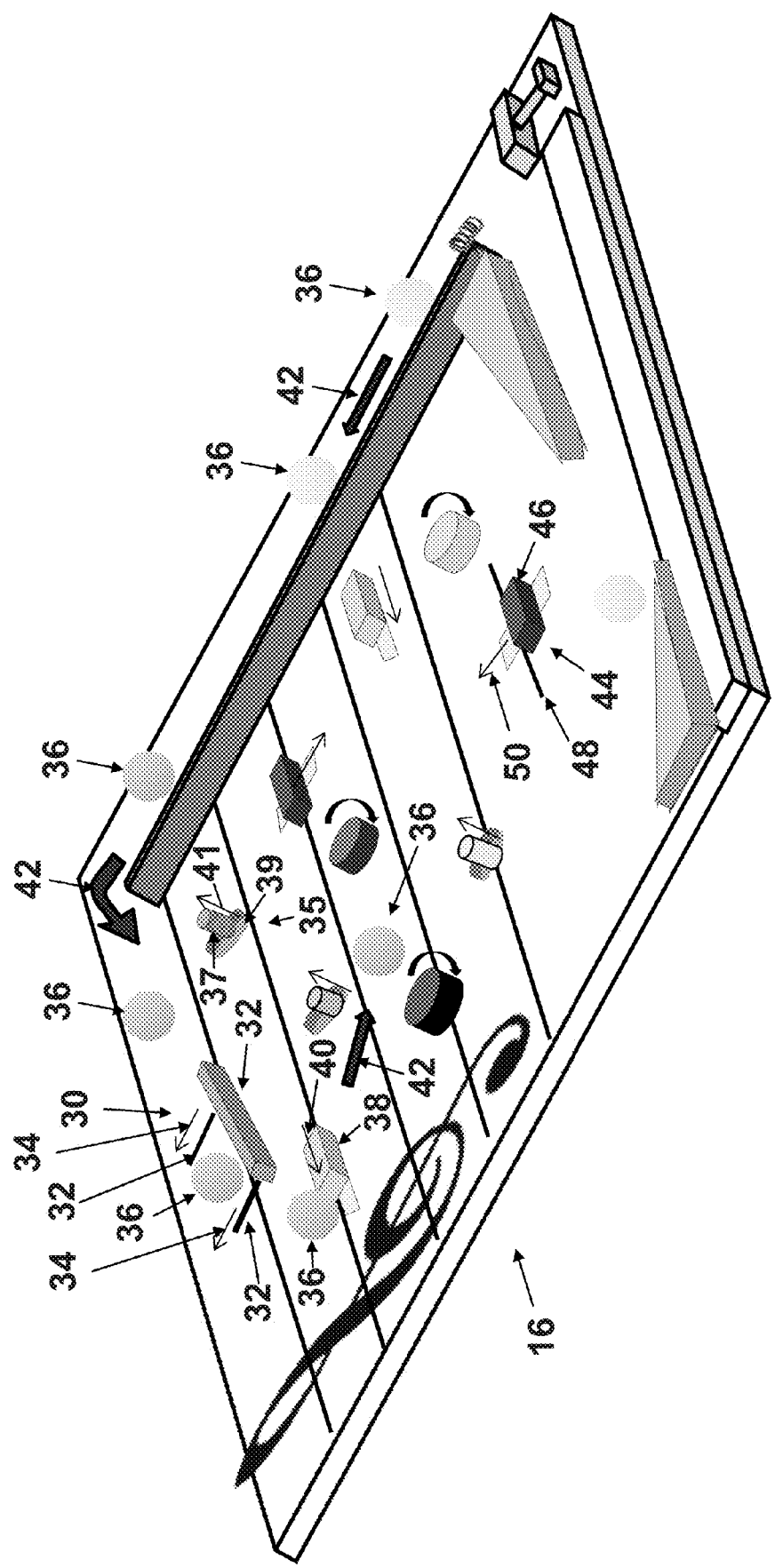
FIG. 7 is an illustration of an example embodiment of the music teaching aid, wherein various pockets are configured and may be manipulated in various ways.

FIG. 7 is an illustration of an example embodiment of the music teaching aid, wherein various pockets are configured and may be manipulated in various ways. Note the keyboard portion 18 is not depicted in FIG. 7 for the sake of simplicity. FIG. 7 depicts an example path (indicated by arrows 42) that a ball 36 may traverse. As depicted in FIG. 7, a pocket (or portion) 30 may comprise a bottom portion 32 and two side portions 34. When a ball 36 lands in the pocket 30, it may be retained by the side portions 32. When a key (e.g., key of keyboard 18) is selected and has a musical note matching the note corresponding to pocket 30, the pocket 30 may be moved in the direction of arrows 34. The movement of the pocket 30 in the direction of arrows 34 may push the ball 36 over the side portions 32 and back into the playing field 16.

As depicted in FIG. 7, when a ball 36 lands in the pocket (or portion) 38, it may be retained by pocket 38. Pocket 38 may be configured such that when a key (e.g., key of keyboard 18) is selected and has a musical note matching the note corresponding to pocket 38, the pocket 38 may be moved in the direction of arrows 40. The movement of the pocket 38 in the direction of arrows 40 may allow the ball 36 to move in the direction of arrow 42 and back into the playing field 16.

As depicted in FIG. 7, pocket (or portion) 44 may comprise a bottom portion 46 and a rail portion 48. When a ball 36 lands in the pocket 44, the ball may be retained by the rail portion 48. When a key (e.g., key of keyboard 18) is selected and has a musical note matching the note corresponding to pocket 44, the pocket 44 may be moved in the direction of arrow 50. The movement of pocket 44 in the direction of arrow 50 may push the ball 36 back into the playing field 16.

In an example embodiment, a pocket (portion) may comprise a recessed rod or the like, that when manipulated, may push a ball back onto the playing field 16. For example, pocket 35 may comprise a rod 37 that may be positioned within region 39 and slightly recessed below the surface of the playing field 16. Region 39 may comprise a cavity in the surface of the playing field 16. A diameter of the cavity 39 may be less than a diameter of a ball, such that when a ball lands on the cavity 39, the ball may be retained by the cavity 39. Note that rod 37 is depicted, in FIG. 7, not in the recessed position. Rather, rod 37 is depicted in the extended position. As ball 36 may land on area 39, the ball may be retained in area 39. When pocket 35 is manipulated (e.g., via selection of a key), rod 37 may move in the direction of arrow 41 and push ball 36 back onto the playing field 16.

Figure 8:
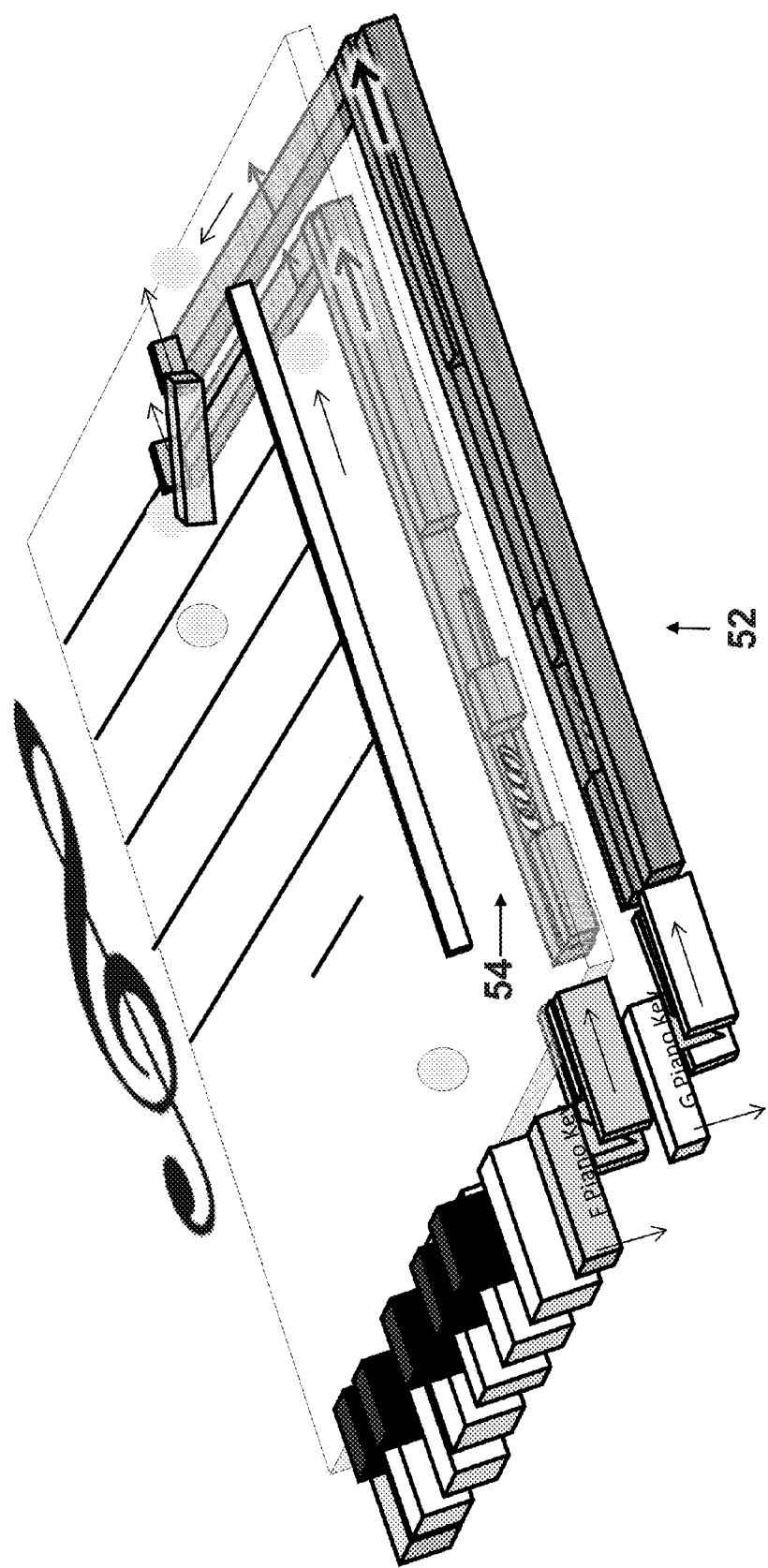
FIG. 8 is an illustration of example mechanical mechanisms for manipulating pockets.

FIG. 8 is an illustration of example mechanical mechanisms for manipulating pockets. As depicted in FIG. 8, mechanical mechanisms 52, 54 may be coupled to keys and pockets. Mechanical mechanisms may be positioned, for example, underneath the playing field. Mechanisms may comprise rods, springs, blocks, etc. that transfer mechanical energy from a key to a pocket. It is to be understood that FIG. 8 is meant to provide a high level depiction of example mechanical mechanisms and their relationships with keys and pockets. Not every detail of each mechanism is depicted in FIG. 8.

Figure 9:
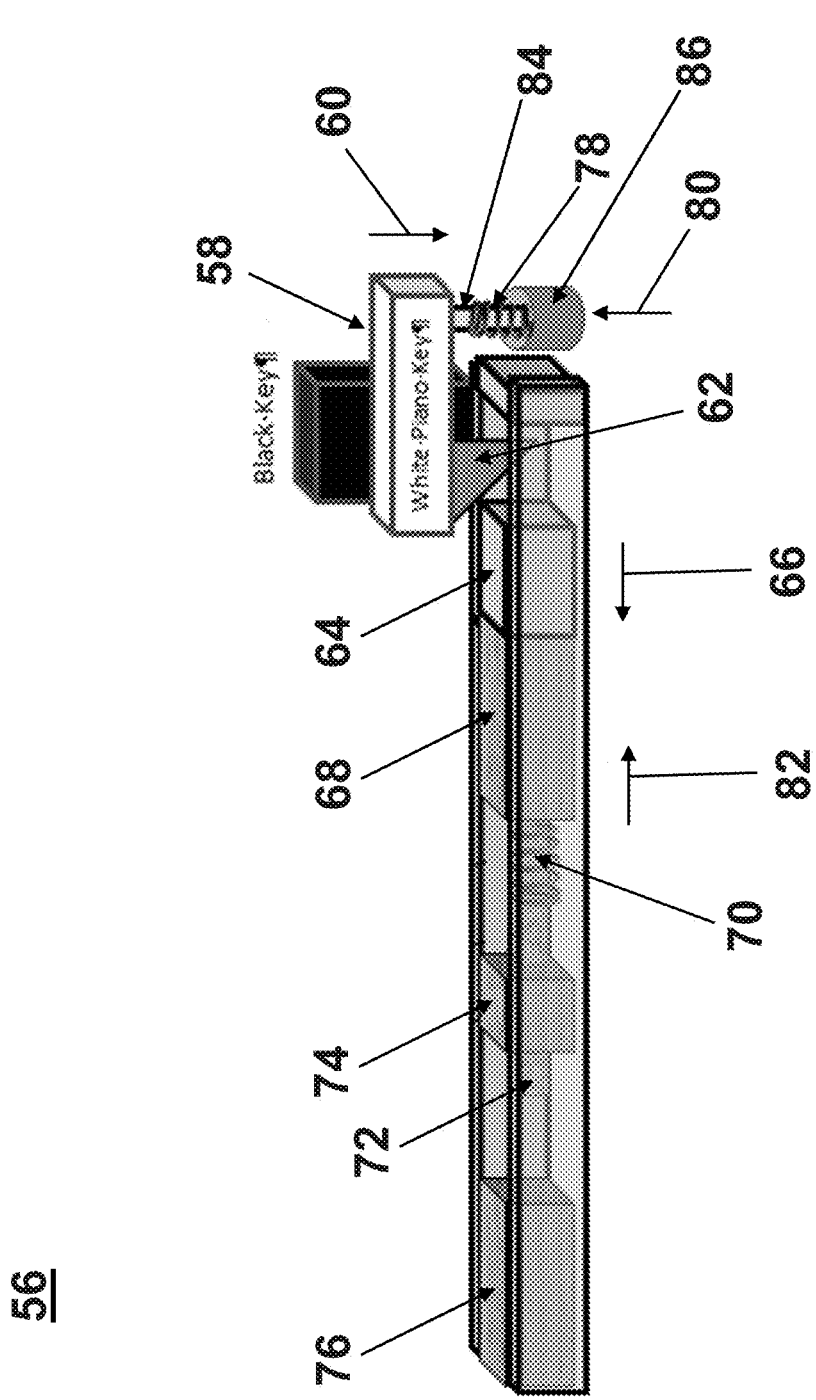
FIG. 9 is an illustration of an example embodiment of mechanical mechanism for manipulating a pocket.

FIG. 9 is an illustration of an example embodiment of mechanical mechanism 56 for manipulating a pocket. As depicted in FIG. 9, when key 58 is selected (e.g., pressed in the direction of arrow 60), mechanism portion 62, which may be attached to key 58, also may move in the direction of arrow 60. As a result, mechanism portion 62 may push mechanism portion 64, which may cause mechanism portion 64 to move in the direction of arrow 66. The movement of mechanism portion 64 may cause mechanism portion 68 also to move in the direction of arrow 66. Rod 72 may be attached to mechanism portion 68, and thus may move in the direction of arrow 66. Mechanism portion 74 may be configured to comprise an opening through which rod 72 may be inserted. Mechanism portion 74 may be attached to any appropriate portion of the music teaching aid apparatus, which may prevent mechanism portion 74 from moving. Accordingly, rod 72 may move freely through mechanism portion 74. And, as mechanism portion 68 moves in the direction of arrow 66, because mechanism portion 74 may not move, spring 70 may become depressed. The movement of rod 72 in the direction of arrow 66 may cause mechanism portion 76 to move in the direction of arrow 66.

Mechanism portion 76 may be coupled to a pocket in any appropriate manner, such that the motion of mechanism portion 76 in the direction of arrow 66 may cause the coupled pocket to be manipulated. For example, mechanism portion 76 may be coupled to pocket 32 depicted in FIG. 7. The motion of mechanism portion 76 in the direction of arrow 66 may cause the pocket 32 to move in the direction of arrows 34.

Key 58 may have a rod 84 attached thereto. Mechanism portion 86 may comprise an opening through which rod 84 may be inserted. When key 58 is selected (e.g., pressed in the direction of arrow 60), the movement of key 58 in the direction of arrow 60 may cause spring 78 to compress between key 58 and mechanism portion 86. When key 58 is deselected (e.g., not being pressed in the direction of arrow 60), spring 78 may decompress (expand) and may cause the key 58 to move in the direction of arrow 80, which may cause mechanism portion 62 to move in the direction of arrow 80. As a result, because any force upon spring 70 from the direction of arrow 66 may be removed, spring 70 may decompress (expand), which may cause mechanism portion 68 to move in the direction of arrow 82. The movement of mechanism portion 68 in the direction of arrow 82 may cause mechanism portion 64 to move in the direction of arrow 82. The movement of mechanism portion 68 in the direction of arrow 82 may cause rod 72 to move in the direction of arrow 82. In an example embodiment, the mechanical mechanism 56 may be positioned such the end comprising mechanism portion 76 may be elevated from the end comprising mechanism element 64. Accordingly, when rod 72 is no longer pushing against mechanism portion 76, mechanism portion 76 may move in the direction of arrow 82 due to gravitational force. In an example embodiment, a spring may be coupled to mechanism portion 76 (spring not shown in FIG. 9) to facilitate movement of mechanism portion 76 may move in the direction of arrow 82. It is to understood that the depiction of mechanical mechanism 56 is for illustration purposes, and that the structure and dimension should not be limited to the depiction of FIG. 9. Thus, the spaces, tolerances, dimensions or the like as depicted in FIG. 9 are for illustrative purposes, and are not be limited thereto.

Figure 10:
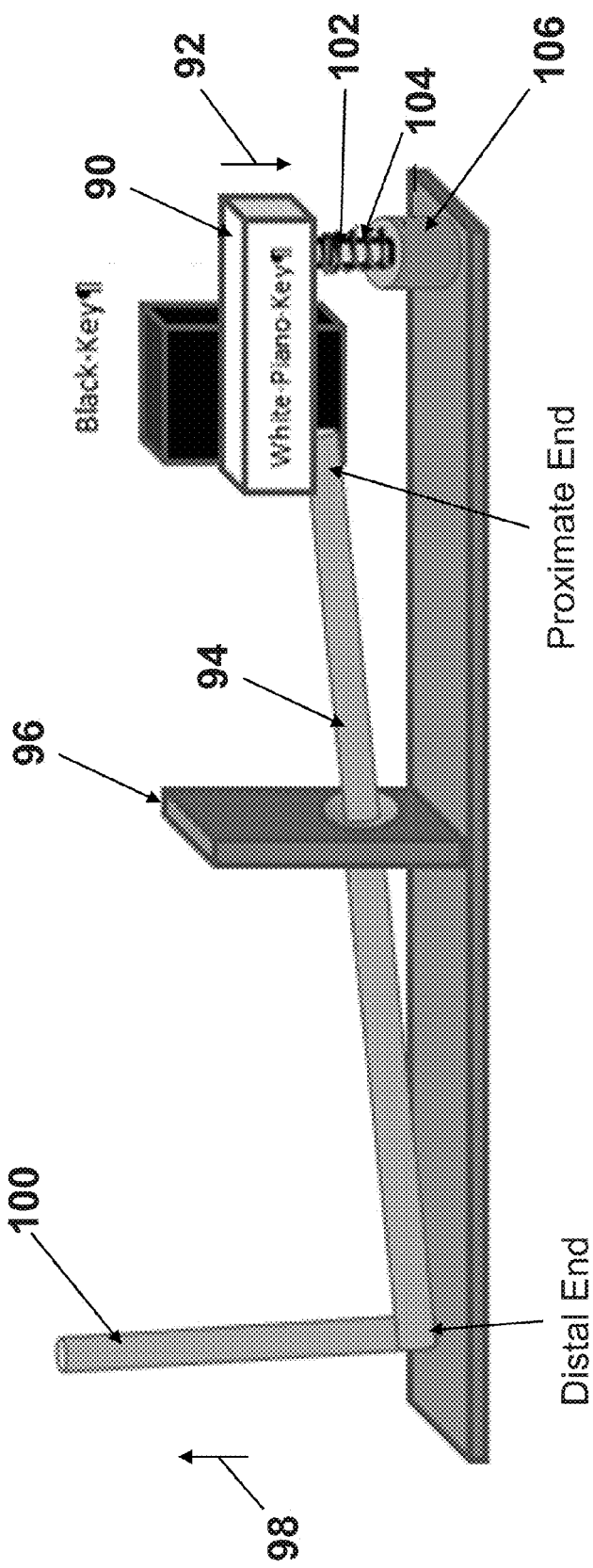
FIG. 10 is an illustration of another example embodiment of mechanical mechanism for manipulating a pocket.

FIG. 10 is an illustration of another example embodiment of mechanical mechanism 88 for manipulating a pocket. As depicted in FIG. 10, when key 90 is selected (e.g., pressed in the direction of arrow 92), the proximate end of rod 94, which may (but not necessarily) be attached to key 90, also may move in the direction of arrow 92. Mechanism portion 96 may comprise an opening through which rod 94 may be inserted. As shown in FIG. 10, mechanism portion 96 may function as a fulcrum. As such, as the proximate end of rod 94 moves in the direction of arrow 92, the distal end of rod 94 may move in the direction of arrow 98. As a result, distal end of rod 94 may push rod 100 in the direction of arrow 98. In an example embodiment, rod 100 may be attached to the distal end of rod 94.

Rod 100 may be coupled to a pocket in any appropriate manner, such that motion of rod 100 in the direction of arrow 98 may cause the coupled pocket to be manipulated. For example, rod 100 may be coupled to pocket 35 depicted in FIG. 7. And rod 100 may be coupled to, as the same as, rod 37. The motion of rod 100 in the direction of arrow 98 may cause the pocket 35 to be manipulated such that rod 37 is moved in the direction of arrow 41.

Key 90 may have a rod 102 coupled thereto. Rod 102 may be attached or positioned next to key 90. Mechanism portion 106 may comprise an opening through which rod 102 may be inserted. When key 90 is selected (e.g., pressed in the direction of arrow 92), the movement of key 90 in the direction of arrow 92 may cause spring 104 to compress between key 90 and mechanism portion 106. When key 90 is deselected (e.g., not being pressed in the direction of arrow 92), spring 104 may decompress (expand) and may cause the key 90 to move in the direction of arrow 98, which may allow the proximate end of rod 94 to move in the direction of arrow 98. The movement of the proximate end of rod 94 in the direction of arrow 98 may be facilitated the movement of rod 100 in the direction of arrow 92 due to gravitational force.

Figure 11:
FIG. 11 is a depiction of example prototype mechanical mechanisms for manipulating pockets (portions) of the music teaching aid.

FIG. 11 is a depiction of example prototype mechanical mechanisms for manipulating pockets (portions) of the music teaching aid.

Figure 12:
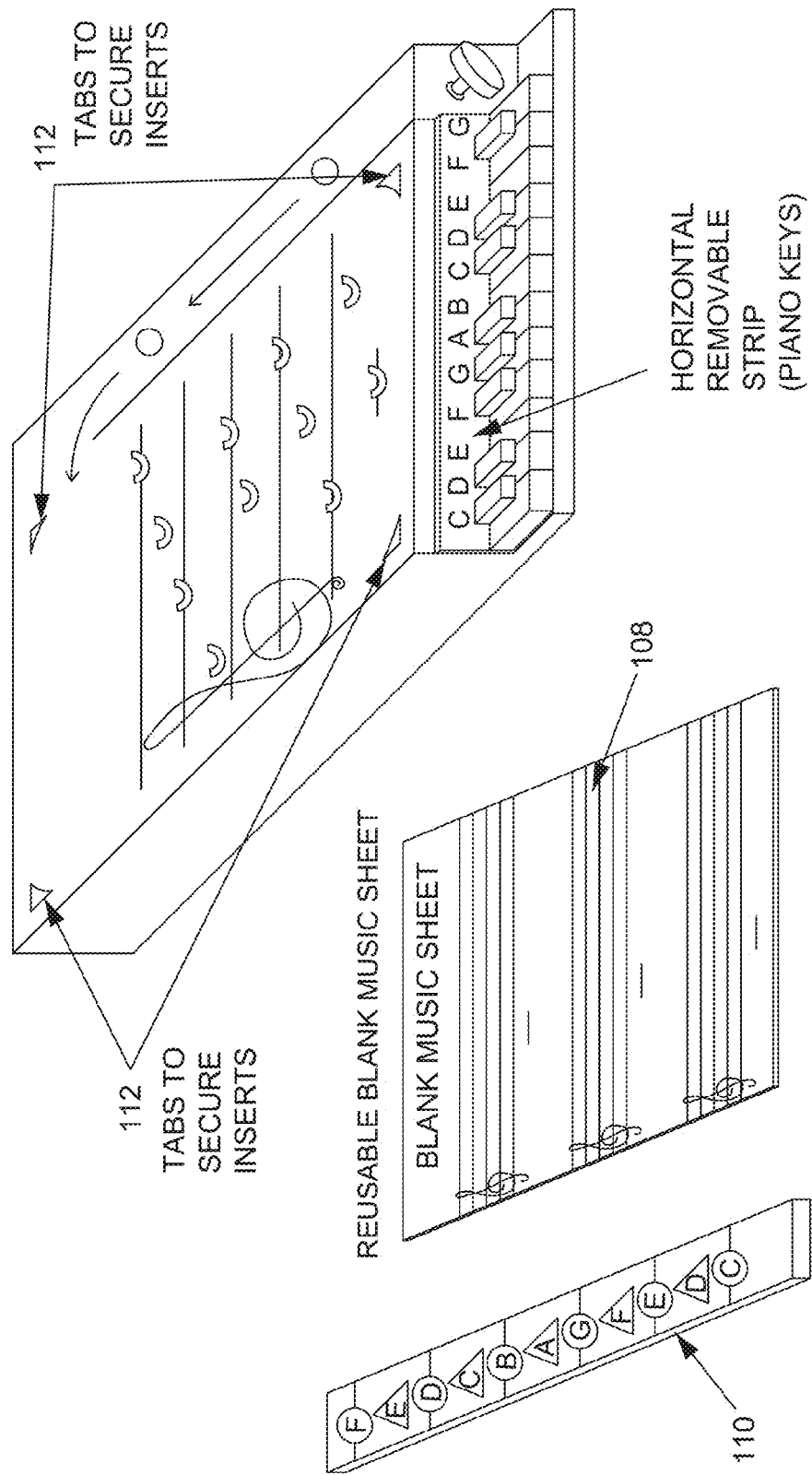
FIG. 12 is an illustration of example sheets and strips that may be removed and attached to the music teaching aid.

In various example embodiments, a surface of a playing field may be modified to comprise various combinations of staves, instruments, notes, lessons, or the like. For example, FIG. 12 is an illustration of example sheets and strips that may be removed and attached to the music teaching aid. Music sheet 108 depicts an example of a blank music sheet. Music sheet 108 may be completed with any appropriate staffs, staves, song, notes, chords, lesson, or the like. In an example embodiment, music sheet 108 may be reusable. Thus, information written on music sheet 108 may be erased. In an example embodiment, music strip 108 may be coupled to the music teaching aid via all or a subset of tabs 112. Strip 110 depicts an example attachable strip comprising musical notes. In an example embodiment, strip 110 may be coupled to the music teaching aid via all or a subset of tabs 112.

Figure 13:
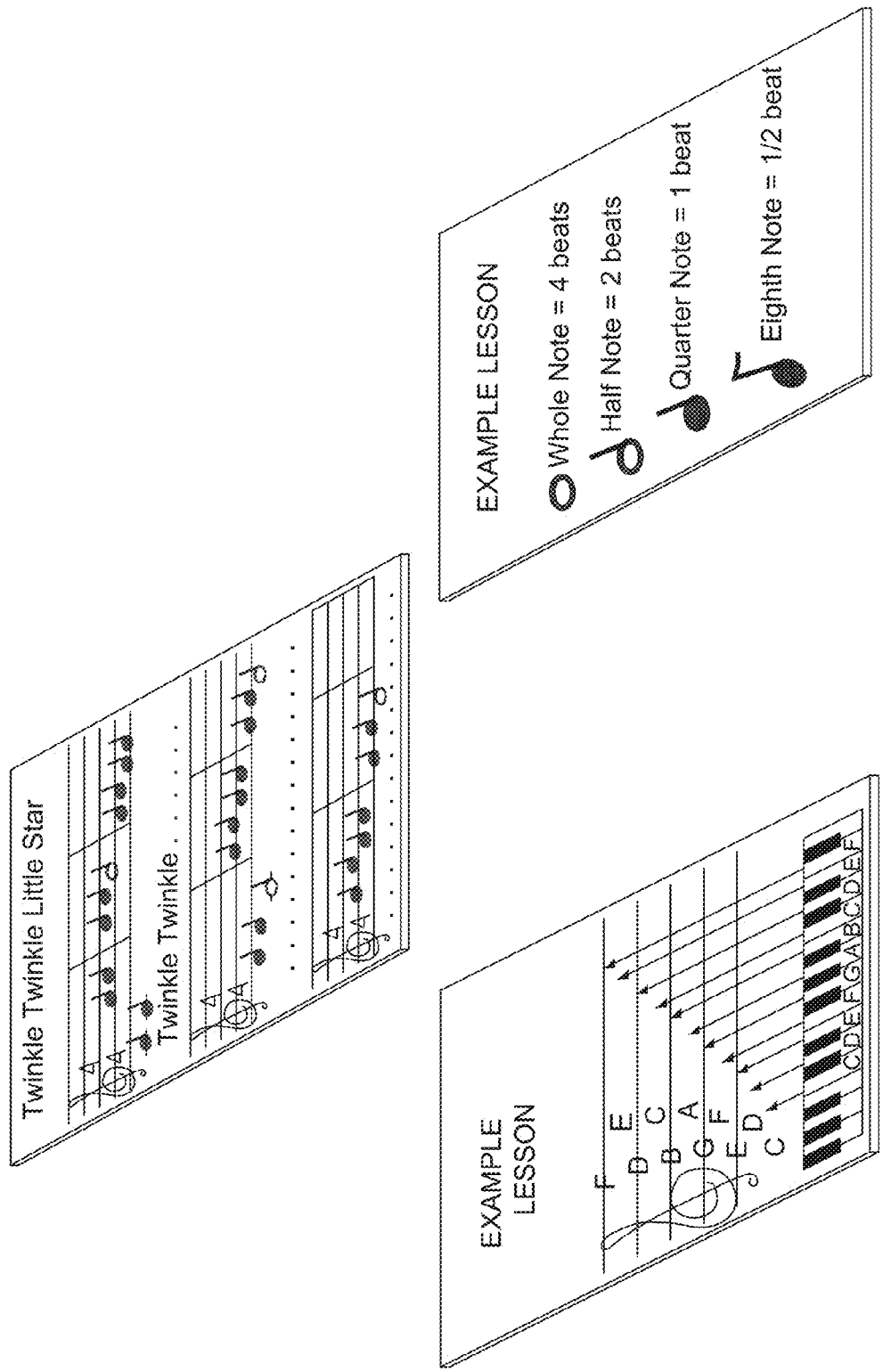
FIG. 13 is an illustration of various example lesson sheets that may be coupled to the music teaching aid.

FIG. 13 is an illustration of various example lesson sheets that may be coupled to the music teaching aid. In an example embodiment, the example lesson sheets depicted in FIG. 13 may be coupled to the music teaching aid via all or a subset of tabs 112 as depicted in FIG. 12.

Figure 14:
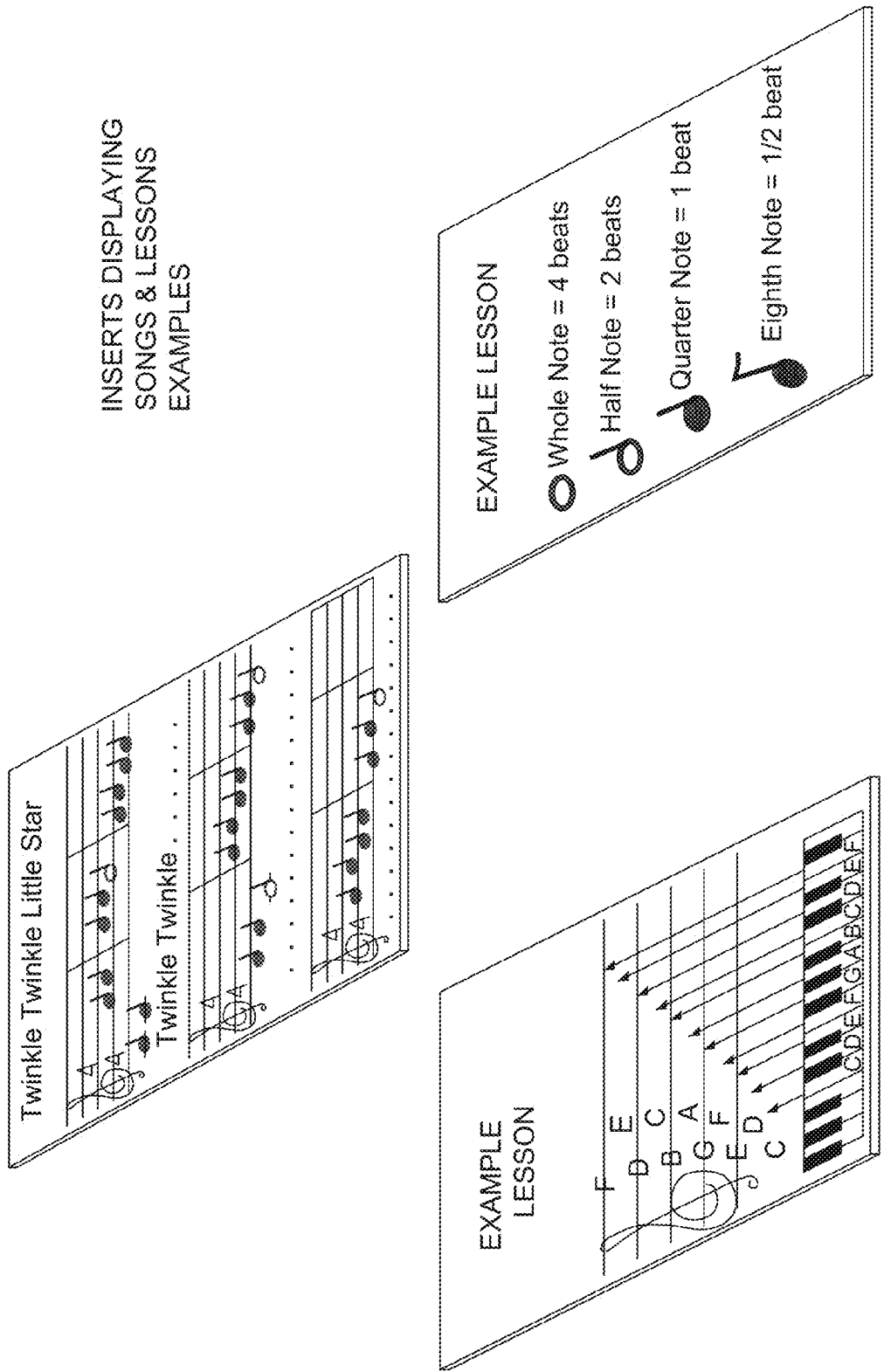
FIG. 14 is an illustration of various additional example lesson sheets that may be coupled to the music teaching aid.

FIG. 14 is an illustration of various additional example lesson sheets that may be coupled to the music teaching aid. In an example embodiment, the example lesson sheets depicted in FIG. 14 may be coupled to the music teaching aid via all or a subset of tabs 112 as depicted in FIG. 12.

Figure 15:
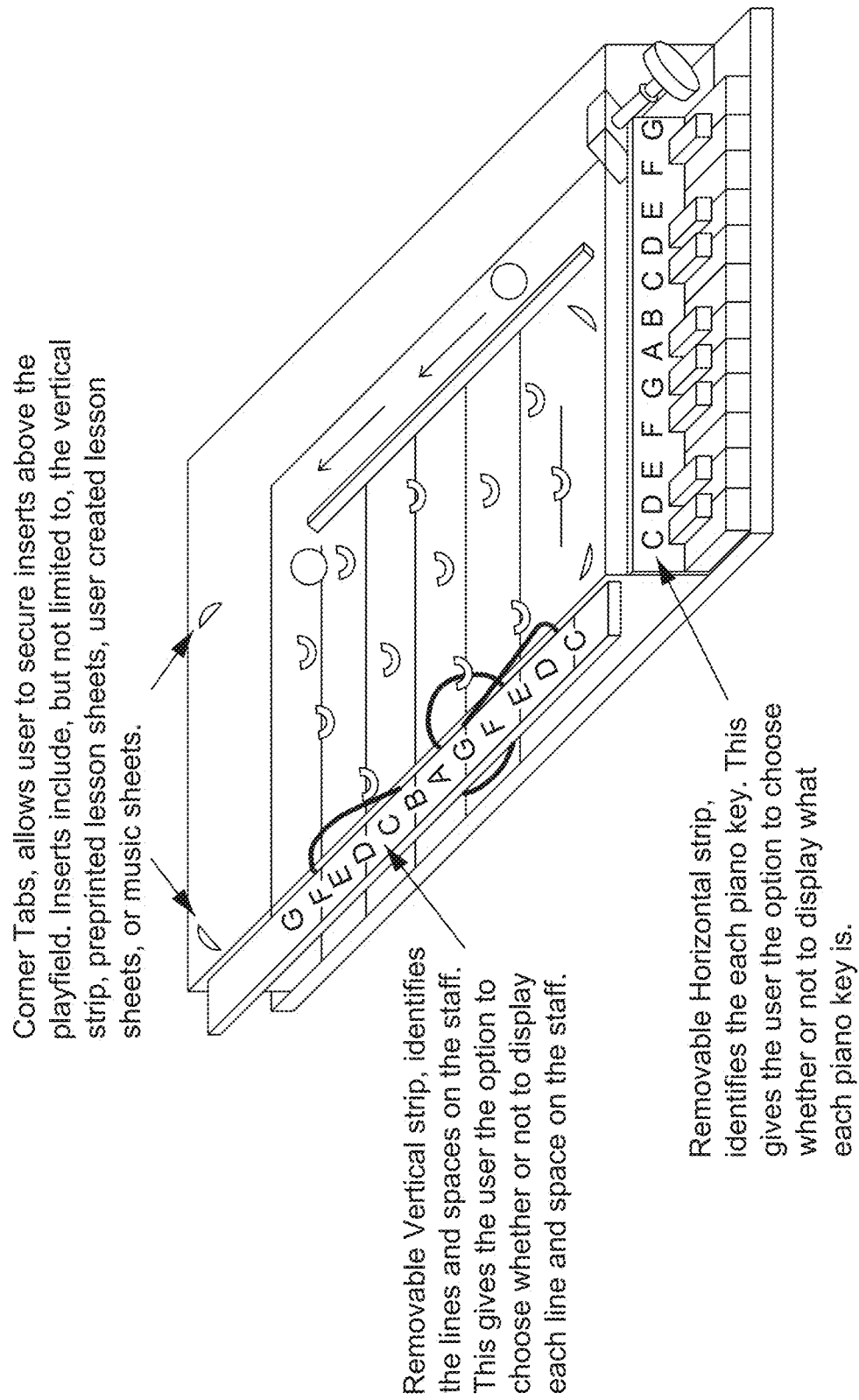
FIG. 15 is an illustration of example coupling of strips/sheets to the music teaching aid.

FIG. 15 is an illustration of example coupling of strips/sheets to the music teaching aid.

Figure 16:
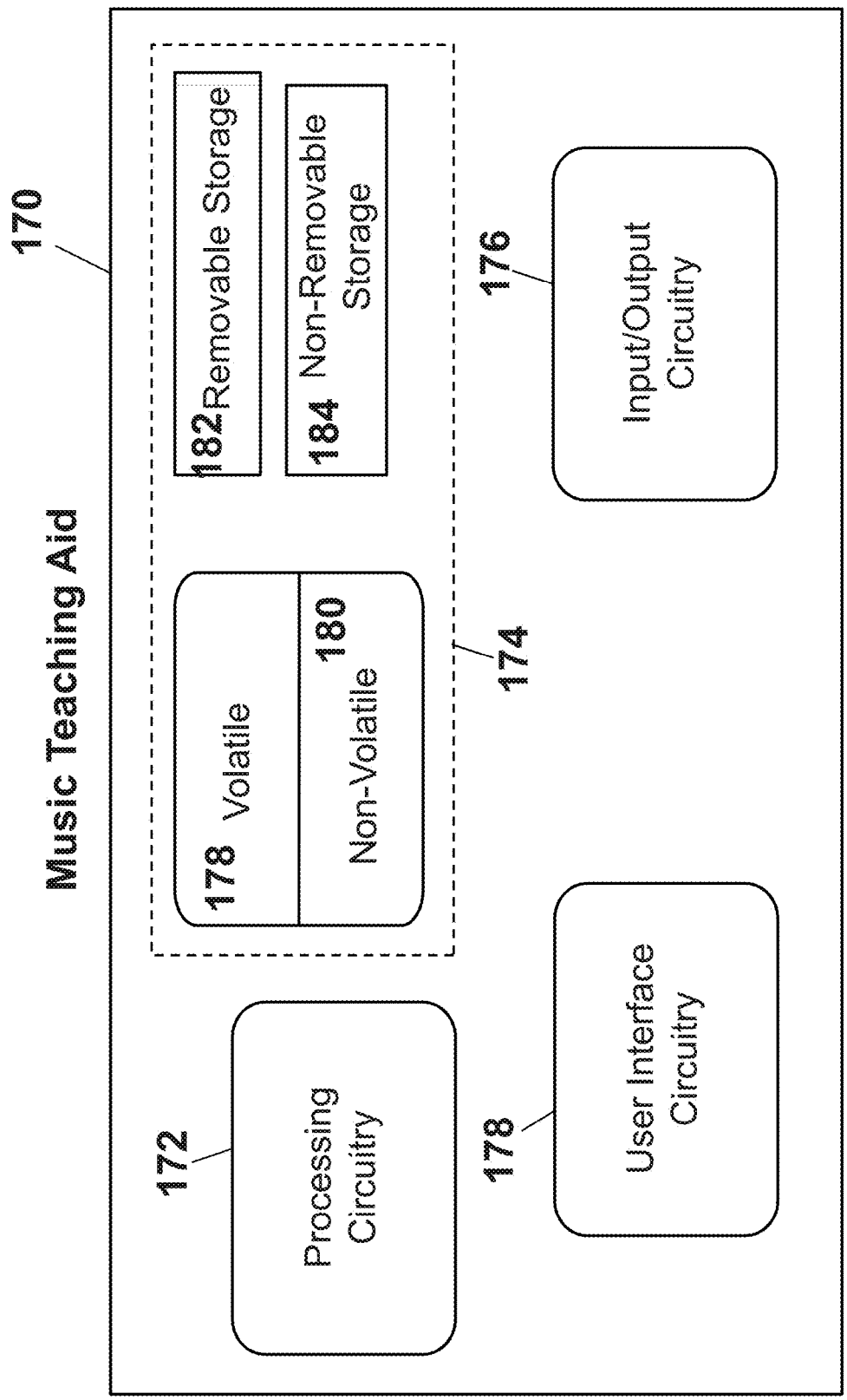
FIG. 16 is a block diagram of another example embodiment of the music teaching aid.

FIG. 16 is a block diagram of another example embodiment of the music teaching aid 170. The music teaching aid 170 depicted in FIG. 16 may represent any appropriate entity, apparatus, or combination of entities or apparatuses, such as a processor, a server, a computer, or the like, or any combination thereof. In an example embodiment, the music teaching aid 170 may comprise hardware, or a combination of hardware and software. And, each portion of the music teaching aid 170 comprises hardware, or a combination of hardware and software. It is emphasized that the block diagram depicted in FIG. 16 is an example and not intended to imply a specific implementation or configuration. Thus, the music teaching aid 170 may be implemented in a single processor or multiple processors (e.g., single server or multiple servers, etc.). Multiple processors can be distributed or centrally located. Multiple processors can communicate wirelessly, via hard wire, or a combination thereof.

In an example configuration, the music teaching aid 170 may comprise processing circuitry 172, memory circuitry 174, input/output circuitry 176, and user interface (UI) circuitry 178. The processing circuitry 172, memory circuitry 174, input/output circuitry 176, and UI circuitry 178 may be coupled together (coupling not shown in FIG. 16) to allow communications therebetween. The input/output circuitry 176 may be capable of receiving and/or providing information from/to a processor and/or any other entity and/or entities configurable to be utilized to facilitate the herein described music teaching aid.

The processing circuitry 172 may be capable of performing functions associated with the herein described music teaching aid. For example, the processing circuitry 172 can be capable of launching a ball, residing a ball in a pocket representative of a note, determining a location of a ball, determining a location of a pocket, determining a note corresponding to a pocket, determining if a selected note matches a noted corresponding to a pocket having a ball residing therein, determining if a selected chard matches a chord corresponding to pockets having balls residing therein, providing an indication of a match, providing an indication of a non-match, or the like, or any appropriate combination thereof.

The memory circuitry 174 can store any information utilized in conjunction with the herein described music teaching aid. For example, the memory circuitry 74 may be capable of storing information pertaining to a note, a chord, a location of a ball, a location of a pocket, notes of a song, chords of a song, a type of instrument being represented, or the like, or any appropriate combination thereof. Depending upon the exact configuration and type of music teaching aid 170, the memory circuitry 174 can include a computer storage medium, or media, that is volatile 178 (such as dynamic RAM), non-volatile 180 (such as ROM), or a combination thereof. The music teaching aid 170 can include additional storage, in the form of computer storage media (e.g., removable storage 182 and/or non-removable storage 184) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is not a propagating signal.

The music teaching aid 170 also may contain communications connection(s) that allow the music teaching aid 170 to communicate with other processors, devices, entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The music teaching aid 170 also can include input device(s) such as keyboard, mouse, pen, voice input device, touch input device, an optical input device, etc. Output device(s) such as a display, speakers, printer, mechanical vibrators, etc. also may be included.

While example embodiments of a music teaching aid have been described in connection with various computing devices/processors, the underlying concepts can be applied to any computing device, processor, or system capable of implementing the herein described music teaching aid. The various techniques described herein can be implemented in connection with hardware or software or, where appropriate, with a combination of both. Thus, the methods and apparatuses associated with the herein described music teaching aid can be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). A computer-readable storage medium is not a propagating signal. When the program code is loaded into and executed by a machine, such as a computer, the machine becomes an apparatus for implementing the herein described music teaching aid. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

In an example embodiment, the music teaching aid 170 may comprise a processor (e.g., processing circuitry 172) coupled to memory (e.g., memory circuitry 174). The memory may comprise executable instructions, that when executed by the processor cause the processor to effectuate operations pertaining to the music teaching aid. Operations may comprise: visually rendering an indication of a playing field comprising at least one portion, wherein each portion of the at least one portion corresponds to a respective playing field musical note; visually rendering a keyboard comprising a plurality of keys, wherein each key of the plurality of keys corresponding to a respective keyboard musical note; upon receiving an indication to launch a game ball, launching the game ball; visually rendering a path, within the playing field, of the launched game ball; determining a location of the launched game ball; when a location of the launched game ball is determined to be proximate to a first portion of the at least one portion, retaining the game ball at a location proximate to the first portion; visually rendering the retained game ball within the playing field; upon receiving a selection of a key of the plurality of keys, when a playing field musical note corresponding to the first portion matches a keyboard musical note corresponding to the selected key, releasing the retained game ball; visually rendering the release of the retained game ball; visually rendering launching the game ball; providing an audible indication of the playing field musical note corresponding to the first portion matching the keyboard musical note corresponding to the selected key; providing a visual indication of the playing field musical note corresponding to the first portion matching the keyboard musical note corresponding to the selected key; audibly rendering the matched note; or the like, or any appropriate combination thereof.

Figure 17:
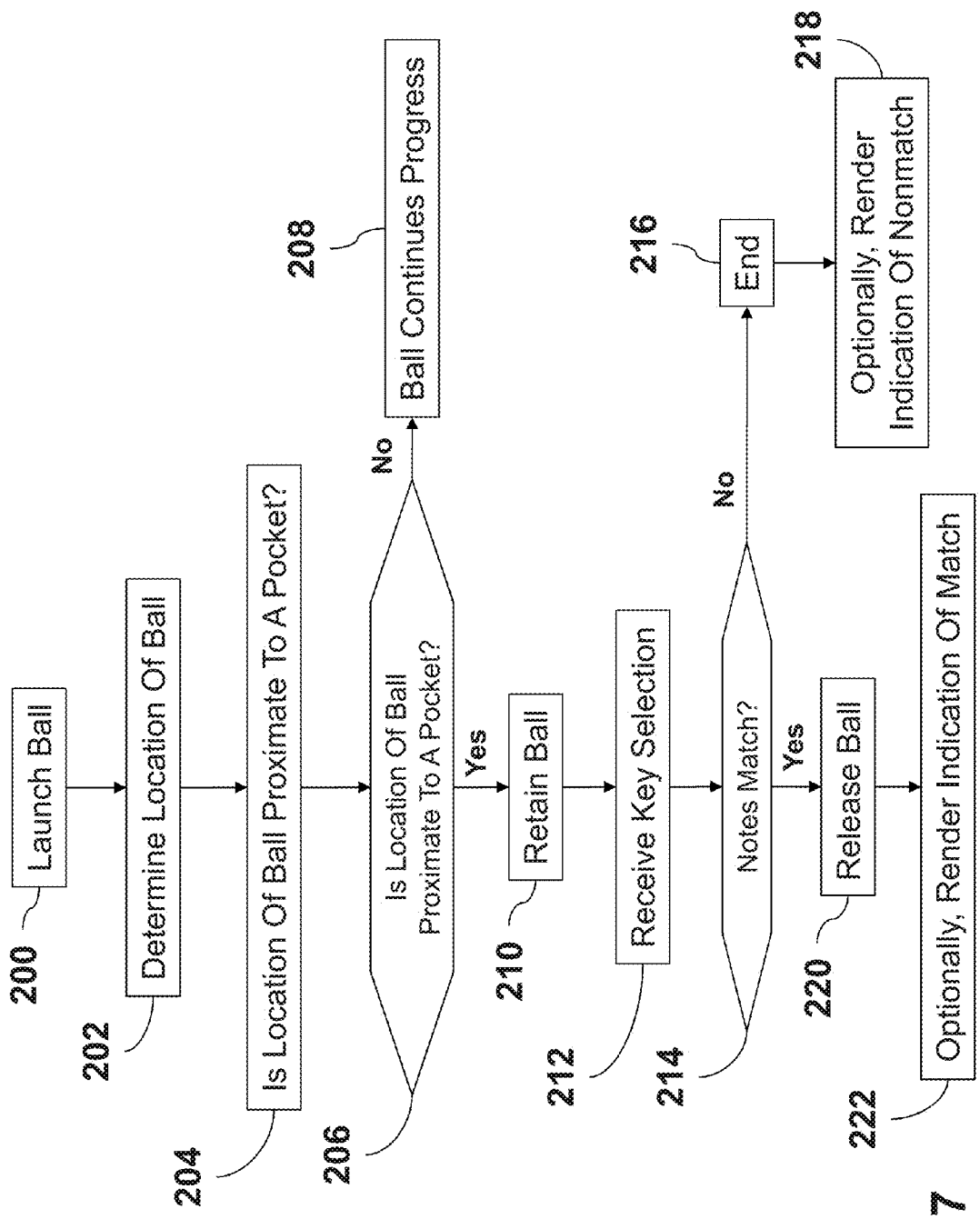
FIG. 17 is a flow diagram of an example process for implementing the herein described music teaching aid.

FIG. 17 is a flow diagram of an example process for implementing the herein described music teaching aid. At step 200 a ball may be launched. At step 202, the ball's location may be determined. At step 204 it may be determined if the ball's current location is proximate a pocket. If it is determined, at step 206, that the ball's current location is not proximate to a pocket, the continues is progress at step 208. If it is determined, at step 206, that the ball's current location is proximate to a pocket, the ball may be retained proximate to the pocket at step 210. A key selection may be received at step 212. At step 214 it may be determined if the note corresponding to the selected key match the note corresponding to the pocket at which the ball is retained. If it is determined that the notes do not match (at step 214), the process may end at step 216, and optionally, an indication of the notes not matching may be rendered at step 218. If it is determined that the notes match (at step 214), the ball may be released at step 220, and optionally, an indication of the notes matching may be rendered at step 218.

The methods and apparatuses for the herein described music teaching aid also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing the herein described music teaching aid. When implemented on a general-purpose processor, the program code combines with the processor to provide a unique apparatus that operates to invoke the functionality of the herein described music teaching aid.

While the herein described music teaching aid has been described in connection with the various embodiments of the various figures, it is to be understood that other similar embodiments can be used or modifications and additions can be made to the described embodiments for the herein described music teaching aid without deviating therefrom. For example, one skilled in the art will recognize that the herein described music teaching aid as described in the present application may apply to any environment, whether wired or wireless, and may be applied to any number of such devices connected via a communications network and interacting across the network. Therefore, the herein described music teaching aid should not be limited to any single embodiment.

What is claimed:

1. An apparatus comprising:
   a playing field comprising a plurality of portions and a ball, each portion of the plurality of portions configured to:
   receive the ball; and
   upon receipt of the ball, retain the received ball at a location proximate to the portion that received the ball, wherein each portion of the plurality of portions corresponds to a respective playing field musical note; and
   a keyboard coupled to the playing field, the keyboard comprising a plurality of keys, each key of the plurality of keys corresponding to a respective keyboard musical note, wherein upon selection of a key of the plurality of keys, a portion of the plurality of portions having a playing field musical note matching a keyboard musical note corresponding to the selected key is caused to release the ball.

2. The apparatus of claim 1, wherein the keyboard comprises a piano keyboard.

3. The apparatus of claim 1, further comprising a plunger for launching the ball into the playing field.

4. The apparatus of claim 1, wherein when the selection of a key causes the ball to be released, the ball is released into the playing field.

5. The apparatus of claim 1, wherein when the selection of a key causes the ball to be released, the ball is released out of the playing field.

6. The apparatus of claim 1, wherein when a playing field musical note matches a keyboard musical note corresponding to the selected key, an indication of the match is audibly provided.

7. The apparatus of claim 1, wherein when a playing field musical note matches a keyboard musical note corresponding to the selected key, an indication of the match is visually provided.

8. The apparatus of claim 1, wherein when a playing field musical note matches a keyboard musical note corresponding to the selected key, an indication of the musical note is audibly provided.

9. The apparatus of claim 1, wherein each portion of the plurality of portions comprises an indication of a musical instrument.

10. A music teaching aid comprising:
    a processor; and
    computing memory coupled to the processor, the computing memory comprising executable instructions that upon execution by the processor cause the processor to effectuate operations comprising:
    visually rendering an indication of a playing field comprising a plurality of portions, each portion of the plurality of portions corresponding to a respective playing field musical note;
    visually rendering a keyboard comprising a plurality of keys, each key of the plurality of keys corresponding to a respective keyboard musical note;
    upon receiving an indication to launch a game ball, launching the game ball into the playing field;
    visually rendering movement of the launched game ball;
    determining a location of the launched game ball;
    when a location of the launched game ball is determined to be proximate to a first portion of the plurality of portions, retaining the game ball at a location proximate to the first portion;
    visually rendering the retained game ball within the playing field;
    upon receiving a selection of a key of the plurality of keys, and upon determining a playing field musical note corresponding to the first portion matches a keyboard musical note corresponding to the selected key, determining to release the retained game ball; and
    visually rendering a release of the retained game ball from the location proximate to the first portion.

11. The music teaching aid of claim 10, wherein the keyboard comprises a piano keyboard.

12. The music teaching aid of claim 10, the operations further comprising visually rendering launching the game ball.

13. The music teaching aid of claim 10, wherein releasing the retained game ball comprises releasing the retained game ball into the playing field.

14. The music teaching aid of claim 10, wherein releasing the retained game ball comprises removing the retained game ball out from the playing field.

15. The music teaching aid of claim 10, the operations further comprising providing an audible indication of the playing field musical note corresponding to the first portion matching the keyboard musical note corresponding to the selected key.

16. The music teaching aid of claim 10, the operations further comprising providing a visual indication of the playing field musical note corresponding to the first portion matching the keyboard musical note corresponding to the selected key.

17. The music teaching aid of claim 10, wherein when a playing field musical note matches a keyboard musical note, audibly rendering the matched note.

18. The music teaching aid of claim 10, wherein each portion of the plurality of portions comprises an indication of a musical instrument.

19. A method comprising:
    upon receiving an indication to launch an entity, launching the entity into a playing field; determining a location of the launched entity relative to the playing field; when a location of the launched entity is determined to be proximate to a first portion of the playing field, retaining the entity at a first location proximate to the first portion, wherein the first location corresponds to a first musical note; and upon receiving a selection of a key of a keyboard having a corresponding second musical note, when the first musical note matches the second musical note, releasing the retained entity from the first location, wherein the entity is a ball.

20. The method of claim 19, further comprising:
    when the first musical note matches the second musical note, audibly rendering the matching note.

* * * * *